(12) United States Patent
Schweiker

(10) Patent No.: US 7,914,210 B2
(45) Date of Patent: Mar. 29, 2011

(54) COUPLING DEVICE FOR COUPLING AT LEAST ONE OPTICAL WAVEGUIDE TO AN OPTICAL COMPONENT

(75) Inventor: Wolfgang Schweiker, Weyarn (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 12/755,523

(22) Filed: Apr. 7, 2010

(65) Prior Publication Data

US 2010/0195960 A1   Aug. 5, 2010

Related U.S. Application Data

(63) Continuation of application No. PCT/EP2008/063350, filed on Oct. 6, 2008.

(51) Int. Cl.
*G02B 6/36* (2006.01)
(52) U.S. Cl. ............... 385/88; 385/53; 385/89; 385/90; 385/91
(58) Field of Classification Search ............ 385/53, 385/88, 89, 90, 91
See application file for complete search history.

(56) References Cited

U.S. PATENT DOCUMENTS

| | | | |
|---|---|---|---|
| 4,812,002 A | 3/1989 | Kato et al. | 350/96.18 |
| 5,772,720 A * | 6/1998 | Taira-Griffin et al. | 65/387 |
| 5,857,050 A | 1/1999 | Jiang et al. | 385/92 |
| 6,318,909 B1 | 11/2001 | Giboney et al. | 385/90 |
| 6,374,004 B1 | 4/2002 | Han et al. | 385/14 |
| 6,394,666 B1 | 5/2002 | Minamino et al. | 385/90 |
| 6,530,698 B1 | 3/2003 | Kuhara et al. | 385/88 |
| 6,838,689 B1 | 1/2005 | Deng et al. | 250/559.3 |
| 2002/0071459 A1 | 6/2002 | Malone et al. | 372/29.02 |
| 2003/0034438 A1 | 2/2003 | Sherrer et al. | 250/216 |
| 2003/0152330 A1 | 8/2003 | Greene et al. | 385/52 |
| 2003/0180453 A1* | 9/2003 | Burke et al. | 427/162 |
| 2005/0059173 A1 | 3/2005 | Chuan et al. | 438/12 |
| 2006/0072879 A1* | 4/2006 | Yang et al. | 385/85 |

FOREIGN PATENT DOCUMENTS

| | | |
|---|---|---|
| EP | 0223242 B1 | 6/1992 |
| EP | 0627641 B1 | 2/1999 |
| EP | 1310811 B1 | 2/2007 |

* cited by examiner

*Primary Examiner* — Jennifer Doan
(74) *Attorney, Agent, or Firm* — C. Keith Montgomery

(57) ABSTRACT

A coupling device for coupling at least one optical waveguide to an optical component having a holding element for holding the at least one optical waveguide, a mounting element for fixing the optical component, and a spacing element. The holding element is fitted to the mounting element. The spacing element is arranged between the holding element and the mounting element, as a result of which the holding element and the mounting element are arranged at a distance from one another.

22 Claims, 4 Drawing Sheets

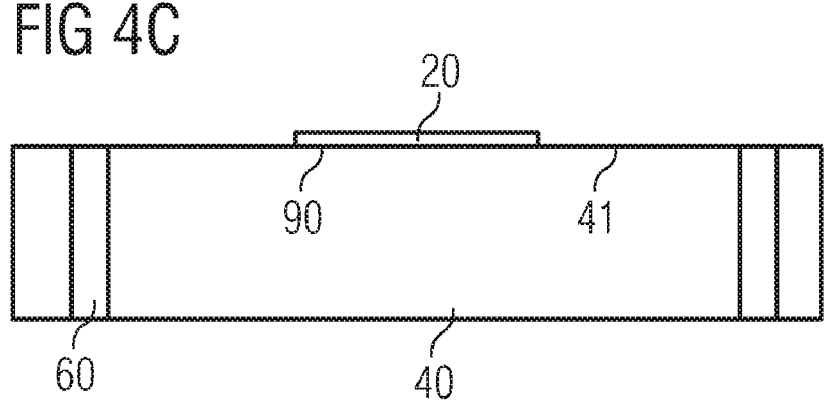
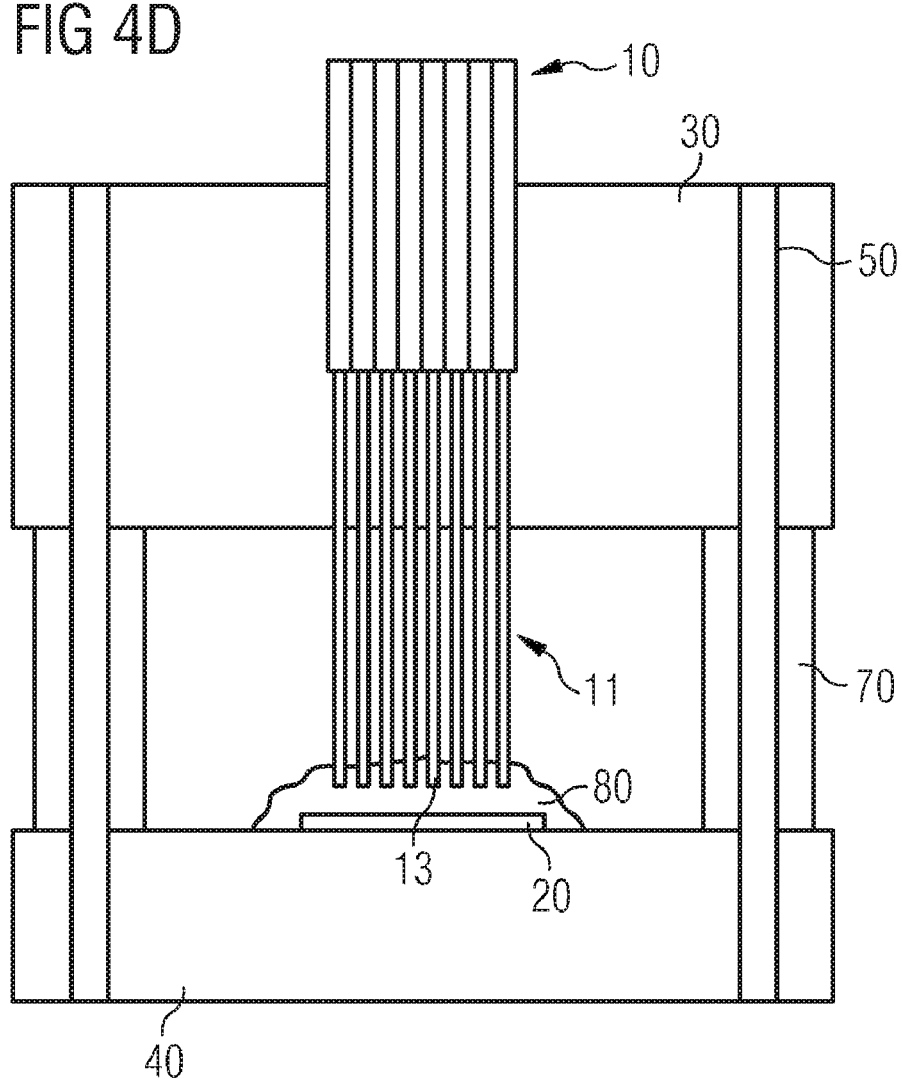

COUPLING DEVICE FOR COUPLING AT LEAST ONE OPTICAL WAVEGUIDE TO AN OPTICAL COMPONENT

CROSS-REFERENCE TO RELATED APPLICATIONS

This application is a Continuation of International Application No. PCT/EP08/063350 filed Oct. 6, 2008, which claims priority to German Application No. 202007014173.4 filed Oct. 10, 2007, both applications being incorporated herein by reference.

BACKGROUND

The invention relates to a coupling device for coupling at least one optical waveguide, for example a fiber ribbon, to an optical component, for example an optical transmitter or an optical receiver.

For many communications applications, in particular for those applications which require a high data rate, for example a data rate of 10 Gbit per second, data must be transmitted by means of an optical transmission path. Copper cables are therefore gradually being replaced by optical cables for operation of data processing centers, supercomputers or for data transmission for digital television (HDTV). In order to transmit signals via an optical transmission path, optical signals are produced from electrical signals and are fed into optical waveguides. In order to receive the signals, the optical signals are output from optical waveguides, and are converted to electrical signals again, for further processing.

Transmitting devices by means of which electrical signals can be converted to optical signals are, for example, VCSEL (vertical cavity surface emitting laser) devices. Optical receiving devices may, for example, be photodiodes, which convert light to electrical signals. The transmitting and receiving devices must be coupled to the optical transmission paths, for example to individual optical waveguides or to a plurality of optical waveguides which, for example, may be arranged in the form of fiber ribbons.

It is therefore a requirement to specify a coupling device for coupling at least one optical waveguide to an optical component, for example an optical transmitter or an optical receiver, which is as space-saving as possible and costs as little as possible, while allowing reliable coupling between the at least one optical waveguide and the optical component. It is also desirable to specify a method for producing a coupling between at least one optical waveguide and an optical component.

SUMMARY

A coupling device for coupling at least one optical waveguide to an optical component comprises a holding element for holding the at least one optical waveguide, a mounting element for mounting the optical component, and a spacing element. The holding element is fitted to the mounting element. The spacing element is arranged between the holding element and the mounting element, as a result of which the holding element and the mounting element are arranged at a distance from one another.

By way of example, the at least one optical waveguide can be held in the holding element such that the at least one optical waveguide projects out of the holding element on a side of the holding element facing the g, as a result of which a section of the at least one optical waveguide is arranged in an intermediate space between the holding element and the mounting element.

According to one embodiment, the holding element may have at least one guide tube for holding the at least one optical waveguide. It is also possible for the holding element to have a plurality of guide tubes for holding optical waveguides of a fiber ribbon. The holding element may contain glass, ceramic or plastic. In one possible embodiment, the holding element may be in the form of a ferrule.

By way of example, at least one guide pin can be arranged in the holding element and projects out of the side of the holding element facing the mounting element. The at least one guide pin may be formed from a metal.

In a further possible embodiment, the spacing element may be in the form of a hollow body which is arranged around the at least one guide pin. By way of example, the spacing element may be in the form of a tubular sleeve composed of a metal, or of an alloy, which contains a nickel-cobalt ferrous alloy such as KOVAR®.

According to a further possible embodiment, the mounting element has at least one cavity for holding the at least one guide pin. Furthermore, the mounting element may have an accommodation element for holding the optical component.

The optical component may be arranged on a side of the mounting element facing the holding element. By way of example, the optical component may be in the form of an optical transmitter or an optical receiver. It is also possible to arrange at least one optical receiver around the optical transmitter on the mounting element.

According to a further embodiment, a protective layer is arranged between the at least one optical waveguide and the optical component such that the optical component and one end of the section of the at least one optical waveguide are surrounded by the protective layer. By way of example, the protective layer may contain silicone, an acrylate, or an epoxy.

Furthermore, one end of said section of the at least one optical waveguide which projects out of the holding element is cut off at an angle other than 90° with respect to a longitudinal axis of the at least one optical waveguide.

A method for producing a coupling between at least one optical waveguide and an optical component is specified in the following text. According to the method, at least one optical waveguide is arranged on a holding element. Furthermore, the optical component is mounted to a mounting element. A spacing element is disposed to the holding element or to the mounting element. The holding element is fitted to the mounting element in order to couple the at least one optical waveguide to the optical component.

According to a further possible embodiment of the method, a coating is removed from a section of the at least one optical waveguide. The at least one optical waveguide is inserted into at least one guide tube in the holding element such that a part of the section of the at least one optical waveguide projects on a side of the holding element facing the mounting element.

That part of the section of the at least one optical waveguide which projects out of the holding element can be shortened. By way of example, during the shortening process, one end of said part of the section of the at least one optical waveguide which projects out of the holding element is cut off at an angle other than 90° with respect to a longitudinal axis of the at least one optical waveguide. By way of example, the end of that part of the section of the at least one optical waveguide which projects out of the holding element can be heated, such that the end has a rounded shape. It is also possible to shape the end of the at least one optical waveguide by chemical etching.

A tubular sleeve can be disposed on a guide pin which projects out of the holding element or the mounting element. The holding element can be fitted to the mounting element by inserting the guide pin of the holding element or of the mounting element into a cavity in the mounting element or the holding element.

Before the optical component is fitted to the mounting element, an area at which the optical component is to be mounted to the mounting element is determined at a distance from the cavity of the mounting element. Furthermore, a protective layer can be fitted between the optical component and the at least one optical waveguide.

Furthermore, an optical transmitter or an optical receiver can be mounted to the mounting element. An optical transmitter can be mounted to the mounting element in order to inject light into said section of the at least one optical waveguide which projects out of the holding element. An optical receiver can be mounted to the mounting element in order to receive light which is reflected at one end of said part of the section of the at least one optical waveguide which projects out of the holding element. By way of example, a control unit may be provided for controlling the light which is produced by the optical transmitter, as a function of an intensity of the light received by the at least one optical receiver.

BRIEF DESCRIPTION OF THE DRAWINGS

The invention will be explained in more detail in the following text with reference to figures, which show embodiments of the present invention, and in which:

FIG. 4C shows a further method step for producing a coupling between at least one optical waveguide and an optical component, FIG. 4D shows a further method step for producing a coupling between at least one optical waveguide and an optical component.

DETAILED DESCRIPTION

Figure 1:
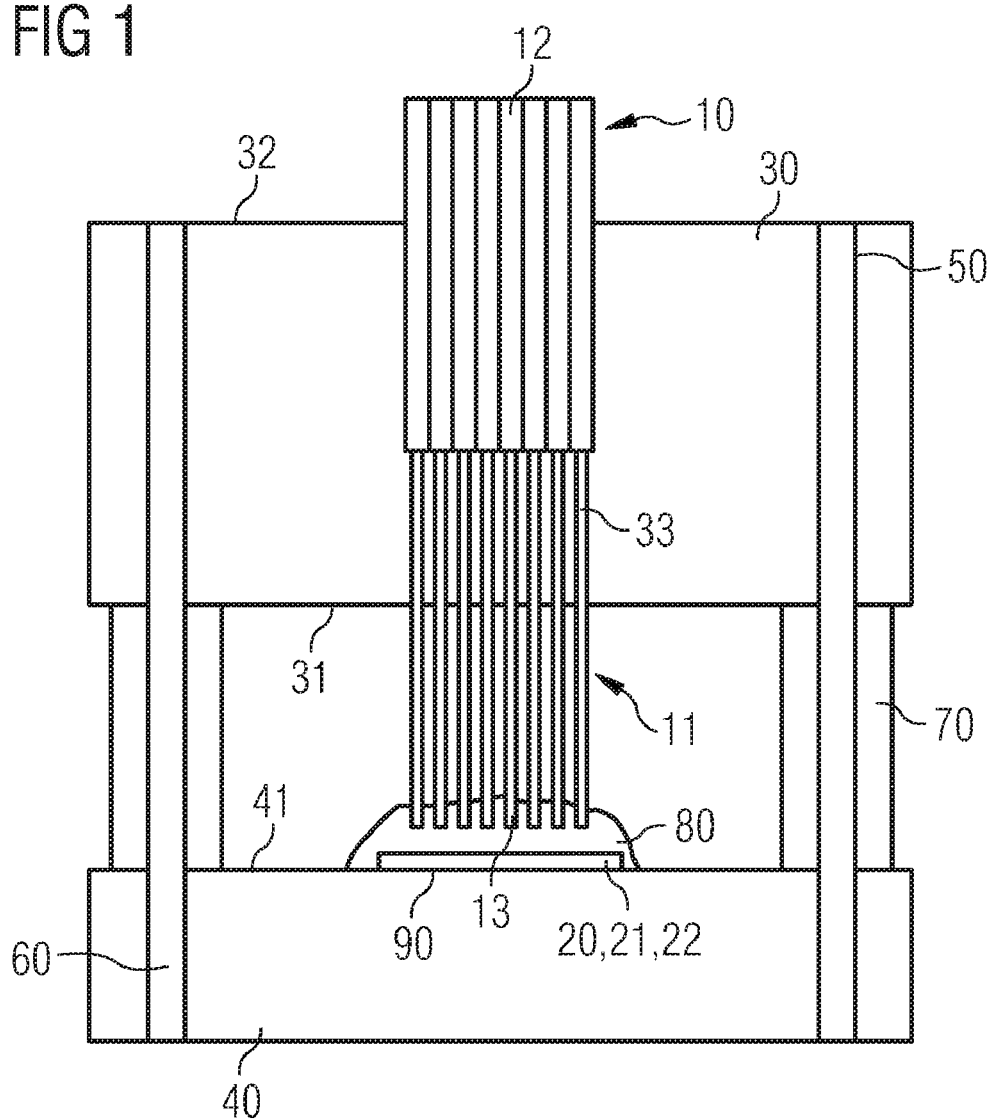
FIG. 1 shows an embodiment of a coupling device for coupling at least one optical waveguide to an optical component.

FIG. 1 shows an embodiment of a coupling device for coupling at least one optical waveguide and an optical component. The coupling device comprises a holding element 30 for holding an optical waveguide 10. By way of example, the holding element may be in the form of a ferrule composed of glass, ceramic or a plastic, for example composed of a glass-fiber-reinforced plastic. The holding element 30 contains at least one guide tube 33, into which an optical waveguide is inserted. When a plurality of optical waveguides in a fiber ribbon are coupled to one optical component, the holding element 30 may also contain a plurality of guide tubes 33 which, as shown in FIG. 1, can be arranged alongside one another. By way of example, the holding element may contain between 8 and 12 guide tubes 33, which are arranged at a distance of 250 µm. The guide tubes are designed such that an optical waveguide 10 can be inserted into each of the guide tubes on one side 32 of the holding element.

A coating 12 on the optical waveguide is removed from a section 11 at the front end of the optical waveguide 10. That section 11 of an optical waveguide from which the coating has been removed projects out of the holding element 30 on a side 31. In the example in FIG. 1, a plurality of optical waveguides 10 in the form of a fiber ribbon have been inserted into the guide tubes 33. In order to fix the optical waveguides to the holding element 30, the individual optical waveguides in the fiber ribbon may, for example, be adhesively bonded into the guide tubes. That section of the optical waveguides from which the coating has been removed may, for example, project by more than 500 µm out of the holding element. By way of example, the holding element may be in the form of a multifiber ferrule.

Guide pins 50 are arranged on the sides of the holding element and emerge from the holding element 30 on the side 31. By way of example, the guide pins 50 may be formed from a metal with a diameter of approximately 1 mm. The guide pins may project by up to more than 500 µm out of the holding element.

A spacing element 70 was placed on the guide pins 50. The spacing element may be in the form of a tubular sleeve. The spacing element 70 may be formed from a metal, for example a noble metal, or from an alloy, for example from an alloy which contains KOVAR®.

An optical component 20 is arranged on a mounting element 40 which, for example, is formed from a glass-fiber-reinforced plastic. The mounting element 40 may have the same thermal coefficient of expansion as the holding element 30, or may be formed from the same material as the holding element 30. The mounting element may, for example, contain a depression or an accommodation element 90, to which the optical component is attached. The optical component is, for example, mounted to the mounting element 40 on a surface 41 of the mounting element. It is also possible to arrange the optical component within the mounting element. In this exemplary embodiment, the optical component can be encapsulated in the mounting element.

By way of example, the optical component may be an optoelectrical component, for example an optical transmitter 21 for producing light, or an optical receiver 22 for converting received optical signals to electrical signals. By way of example, an array of a plurality of lasers can be arranged on the mounting element as an optical transmitter 21. By way of example, a plurality of VCSELs (vertical cavity surface emitting lasers) can be arranged as optical transmitters on the surface 41. If each of the transmitters is coupled to one optical waveguide in a fiber ribbon with 12 optical waveguides, the optical transmitter may comprise, for example, 12 VCSELs. Instead of optical transmitters, optical receivers, for example photodiodes, can also be arranged on the surface 41 of the mounting element 40. It is also possible to arrange a combination of optical transmitters and optical receivers on the mounting element 40.

The mounting element 40 furthermore contains cavities 60 into which the guide pins 50 can be inserted. The dimensions of the cavities 60, in particular the diameters of the cavities 60, are for this purpose matched to the diameters of the guide pins 50. In the case of the embodiment illustrated in FIG. 1, the holding element 30 is arranged on the mounting element 40 by inserting the guide pins 50 into the cavities 60 in the mounting element 40. By way of example, the optical component is arranged on the surface 41 of the mounting element relative to the cavities 60. When the guide pins 50 are inserted into the cavities 60 in the mounting element, this therefore ensures that the optical waveguides are aligned with the optical component, and are coupled to the optical component.

If the spacing elements 70 are in the form of tubular sleeves, the sleeves of the spacing elements have, for example, a larger diameter than the diameter of the guide pins 50. It is therefore possible to arrange the ferrule 30 at a distance from the mounting element 40, which distance is governed by the length of the tubular sleeves 70. By way of example, the length of the spacing elements 70 is chosen such that ends 13 of the sections 11 of the optical waveguides are, for example, arranged at a distance of between 1 µm and 400 µm from the optical component 20.

Figure 2A:
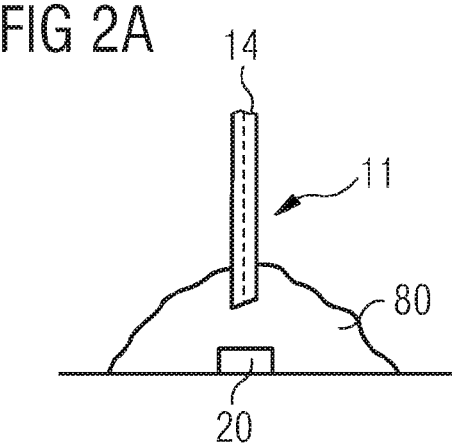
FIG. 2A shows an embodiment of ends of optical waveguide sections for coupling to an optical component.

The free ends of the sections 11 of the optical waveguides may be cut off, for example, approximately at right angles, as is illustrated in FIG. 1. It is also possible for the optical waveguides to be cut off at an angle of between, for example, 8° and 45° with respect to the respective longitudinal axes 14 of the optical waveguides. FIG. 2A shows a side view of an arrangement in which the ends of the optical waveguides have been cut at an angle of up to 45°. This avoids back-reflections which occur from the ends 13 of the sections 11 of the optical waveguides, in the direction of the optical components 20. If the optical components are in the form of optical transmitters 21, for example lasers, this makes it possible to prevent light which has been scattered on the ends 13 of the optical waveguide sections from striking the laser sources 21 again and interfering with the production of the light to be injected into the optical waveguides. This makes it possible to very likely ensure that the lasers 21 oscillate in a controlled manner.

Figure 2B:
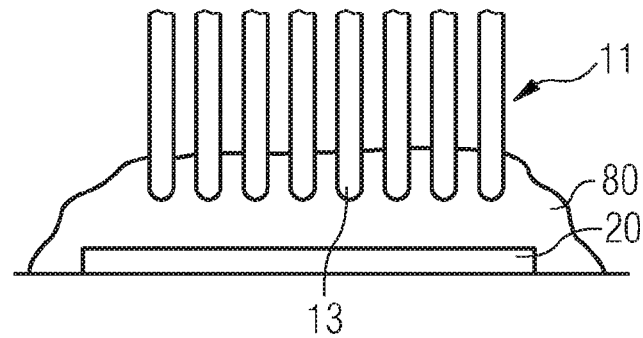
FIG. 2B shows a further embodiment of ends of optical waveguide sections for coupling to an optical component.

FIG. 2B shows a further embodiment of the coupling device, in which the ends 13 of the optical waveguides are rounded. This results in a lens effect, which makes it possible to focus the light emerging from the ends 13 of the optical waveguide sections 11 onto optical receivers 22.

In order to ensure that the optical components are aligned with the optical waveguides 10, the optical transmitters 21 and the optical receivers 22 are arranged on the mounting element 40 at the same distance apart as the sections 11 of the optical waveguides 10. In the case of a fiber ribbon, the optical components are, for example, arranged at a distance of 250 µm apart on the mounting element. If standard telecommunication fibers with a distance between centers of 125 µm to 127 µm are used as optical waveguides, it is possible to reduce the free distance between the guide tubes 33 in the holding element 30 to such an extent that the guide tubes are arranged directly alongside one another.

The arrangement of optical transmitters 21 with respect to the optical waveguide sections 11 and with respect to the cavities 60 ensures that the light which is produced by the optical transmitters 21 is injected into the optical waveguides which are opposite the optical transmitters. In a corresponding manner, the alignment of optical receivers 22 relative to the cavities 60 ensures that the light emerging from the optical waveguide sections 11 is detected by the optical receivers opposite the respective optical waveguide sections. For example, if a fiber ribbon with twelve optical waveguides each separated by a distance of 250 µm is arranged in the holding element 30, twelve VCSELs or twelve photodiodes can be arranged on the mounting element 40, likewise each separated by a distance of 250 µm from one another.

In order to reduce back-reflections at the ends 13 of the optical waveguide sections 11 onto the opposite optical transmitters of the component 20, it is possible, for example, to apply a protective layer 80 around the optical component 20 and the ends 13 of the optical waveguide sections 11. The protective layer 80 may be formed from a material which is transparent for the emitted wavelength. The refractive index of the protective layer corresponds approximately to the refractive index of the optical waveguides. By way of example, the refractive index is in a range between 1.3 and 1.5. The protective layer 80 may be in the form of a partially curing or entirely curing layer. For example, it is possible to use a polymer which can be cured by means of UV light. Polymers such as these contain acrylates, for example. It is also possible to use materials based on epoxies or polyurethane. The protective layer 20 may also be in the form of a two-component adhesive which, for example, contains a hardener and a resin. Furthermore, the protective layer 80 may contain silicone, which is self-curing at room temperature. The protective layer 80 increases the coupling efficiency between the optical waveguides and the optical component. Furthermore, the layer 80 offers protection against mechanical loading and protection against damage to the ends of the optical waveguides and the optical components.

Figure 3:
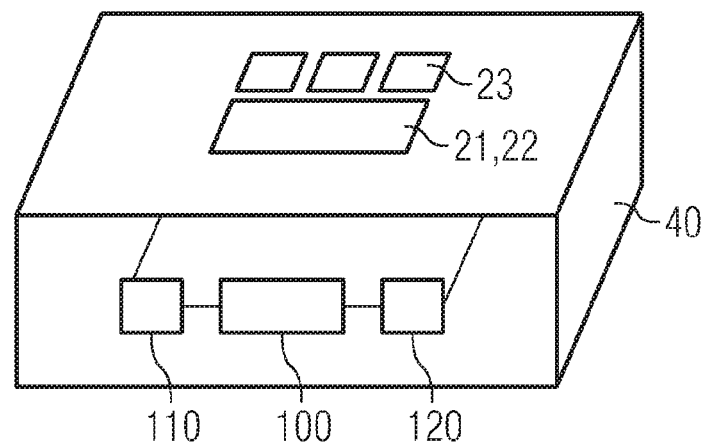
FIG. 3 shows an embodiment of a mounting element with a control unit for controlling the production of an optical signal.

FIG. 3 shows one embodiment of the mounting element 40, on which both an optical transmitter 21 and optical receivers 23 are arranged. The optical transmitters may, for example, be in the form of VCSELs. The optical receiver components 23 may, for example, be photodiodes, which are arranged as a photodiode array on one side of the optical transmitter 21. By way of example, the optical receivers 23 may be connected to a control circuit 100 via photodiode amplifiers 110. By way of example, the photodiode amplifiers may be transimpedance amplifiers (TIA). The control unit 100 controls the production of light by the optical transmitter 21. For this purpose, it can be connected to the optical transmitter 21 via a driver circuit 120 (VCSEL driver).

Light which is fed into the optical waveguide sections 11 from the optical transmitter 21 is partially reflected by the inclined end surfaces of the optical waveguide sections 11, and strikes the optical receivers 23. By way of example, the optical receivers 23 are in the form of photodiodes, and act as monitor diodes. The intensity of the light detected by the optical receivers is amplified by the receiving amplifiers 110, and is evaluated by the control unit 100. The production of light by the optical transmitters 21 is controlled as a function of the detected light intensity of the scattered light. When using a laser as an optical transmitter, for example, this makes it possible to counteract power fluctuations of the laser, which occur as a result of temperature fluctuations or aging effects, and to monitor and to readjust the power of the optical transmitters.

A method for producing a coupling between the optical waveguides 10 and the optical component 20 will be specified in the following text with reference to FIGS. 4A TO 4D.

Figure 4A:
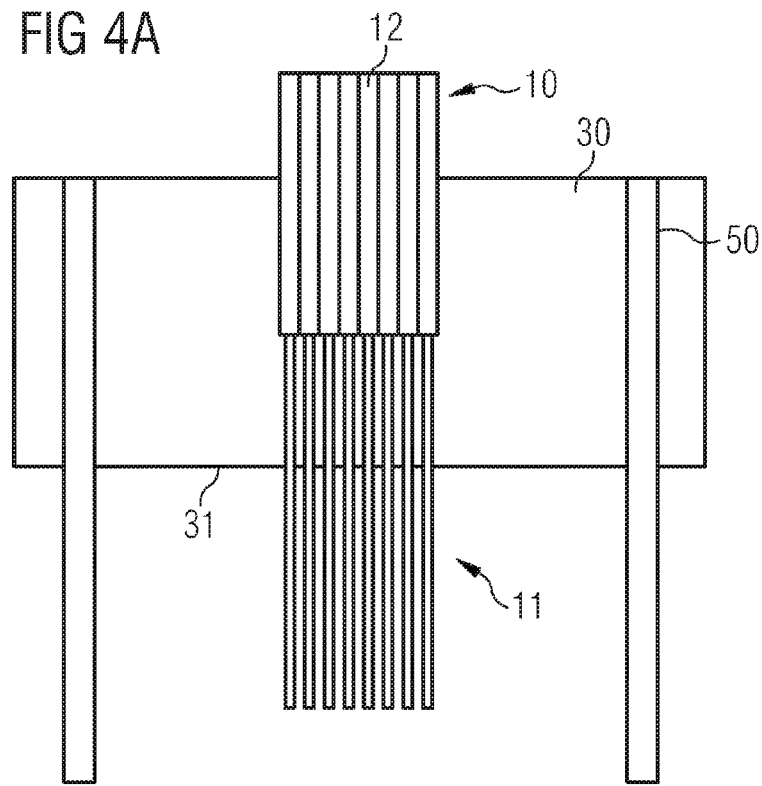
FIG. 4A shows a method step for producing a coupling between at least one optical waveguide and an optical component.

In order to prepare the optical waveguides 10 for coupling to an optical component, a coating 12 is first of all removed from the optical waveguides. By way of example, the optical waveguides 10 may be in the form of a fiber ribbon. A holding element 30, which may be in the form of a ferrule, is used to accommodate and hold the optical waveguides 10. When a plurality of optical waveguides in the fiber ribbon are intended to be coupled to the optical component, it is possible, for example, to use a multifiber ferrule. As is shown in FIG. 4A, the optical waveguides 10 in the fiber ribbon are pushed into guide tubes 33 in the holding element 30. The optical waveguides are inserted into the guide tubes such that a part of the optical waveguide sections 11 from which the coating 12 has been removed projects on a side 31, which faces the mounting element 40, out of the holding element 30 with a length of, for example, more than 500 µm. For fixing to the holding element 30, the optical waveguides are, for example, adhesively bonded in the guide tubes 33 in the holding element 30.

Figure 4B:
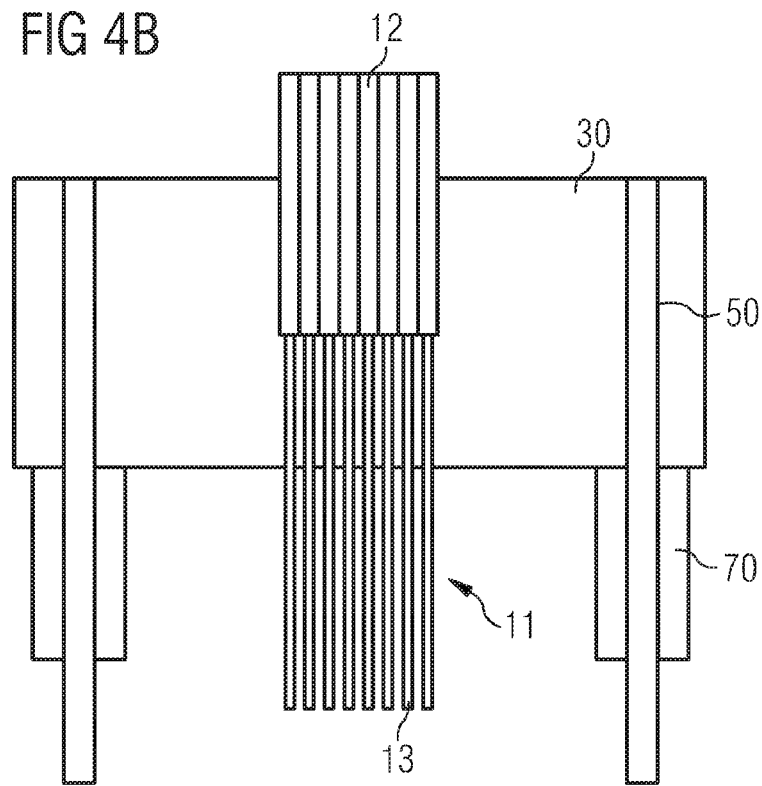
FIG. 4B shows a further method step for producing a coupling between at least one optical waveguide and an optical component.

In order to ensure that the optical waveguide sections which emerge on the side 31 from the holding element 30 are at a specific distance from the optical component, spacing elements 70 are arranged between the holding element 30 and the mounting element 40. The spacing elements may be arranged as tubular sleeves on guide pins 60. The length of the spacing elements 70 governs the distance between the holding element 30 and the mounting element 40, and the distance between the ends of the optical waveguide sections 11 and the optical component 20. FIG. 4B shows the holding element 30 with the spacing elements 70, which are pushed onto the guide pins 50.

By way of example, a $CO_2$ laser can be used to adapt the length of the optical waveguide sections 11, and is used to shorten all the optical waveguides to the same length. By way of example, the laser can be aligned relative to the ends of the spacing elements 70. This ensures that all the ends of the optical waveguide sections 11 are at a defined distance from the ends of the spacing elements 70. The ends 13 of the optical waveguide sections 11 are, for example, shortened with respect to the ends of the spacing elements such that the distance between the ends of the spacing elements 70 and the ends 13 of the optical waveguide sections 11 is in a range between 100 µm and 500 µm.

The ends of the optical waveguide sections 11 may be cut off by the laser at an angle of 90° with respect to the longitudinal axis of the optical waveguides 10, as is shown in FIG. 4B. As is shown in FIG. 2A, the ends of the optical waveguide sections may also be cut off at an angle between 8° and 45°. Cutting off the ends of the optical waveguide sections 11 at an angle between 8° and 45° very likely prevents light which is injected into the optical waveguide section from an optical transmitter being reflected back onto the optical transmitter.

In order to improve the coupling efficiency between the optical waveguide sections 11 and the optical component 20, it is possible to make the ends of the optical waveguide sections 11 rounded, as is shown in FIG. 2B. The rounded shape of the ends of the optical waveguides creates a lens effect. Light emerging from the optical waveguide sections 11 is therefore guided to the optical component 20, for example to an array of photodiodes. The rounding of the ends of the optical waveguide sections 11 is carried out, for example, by a controlled etching process or by a controlled fusion process, by means of a laser.

The optical component 20 which, for example, may be in the form of an array of optical transmitters 21 or an array of optical receivers 22, is arranged on the mounting element 40. FIG. 4C shows an optical component 20 which is fixed on one surface 41 of the mounting element 40. The optical transmitters 21, which, for example, may be in the form of VCSELs (vertical cavity surface emitting lasers) or a photodiode array, are, for example, aligned relative to cavities 60 in the mounting element 40. The cavities 60 are suitable for holding the guide pins 50. The optical components can be aligned with respect to the cavities 60 by means, for example, of an image processing system. The optical components are positioned during the alignment process such that one optical component is in each case opposite and at a distance from an optical waveguide section 11, when the holding element 30 is mounted to the mounting element 40. The optical components can be attached to an accommodation element 90 by means of an adhesive or mechanically.

As is shown in FIG. 4D, the holding element 30 is fixed to the mounting element 40 by pushing the guide pins 50, which are attached to the holding element 30, into the cavities 60 in the mounting element 40. The dimensions of the cavities 60, in particular their diameters, are for this purpose matched to the guide pins 50. The spacing elements 70, which rest on the surface 31 of the holding element and the surface 41 of the mounting element, ensure that the ends of the optical waveguide sections 11 are kept at a short distance of between, for example, 1 µm and 400 µm away from the optical components. Since the optical components on the mounting element 40 are aligned relative to the cavities 60, this ensures that the optical components are aligned with respect to the ends of the optical waveguide sections 11.

A protective layer 80 is arranged above the optical component on the mounting element 40, in order to protect the ends of the optical waveguide sections 11 and the optical component 20. The protective layer is applied to the mounting element 40 such that both the optical component 20 and the ends 13 of the optical waveguide sections 11 are surrounded by the protective layer 80. By way of example, the protective layer may be in the form of a partially curing or entirely curing layer. By way of example, the protective layer may contain an acrylate, which is cured by means of UV light. Furthermore, a layer composed of silicone can also be applied over the optical component 20, and this is self-curing at room temperature. The application of the protective layer 80 reduces back-reflections from the optical waveguide sections 11. Furthermore, the coupling efficiency between the optical waveguide sections and the optical component is increased.

In order to regulate the power of an optical transmitter, for example the laser power of a laser, the radiation which is reflected or scattered back at the ends of the optical waveguide sections 11 is evaluated. This may be done, for example, by additionally arranging a plurality of optical receivers 23, for example an array of photodiodes, around an optical transmitter 21. The power of the optical transmitter 21 is readjusted as a function of the intensity of the light received by the optical receivers 22. This makes it possible to monitor and regulate out fluctuations in the power of the optical transmitter, for example fluctuations in the power of a laser, which occur as a result of aging effects or temperature fluctuations.

What is claimed is:

1. A coupling device for coupling at least one optical waveguide to an optical component, comprising:
    a holding element for holding the at least one optical waveguide;
    a mounting element for mounting the optical component; and
    a spacing element,
    wherein the holding element is fitted to the mounting element, and
    wherein the spacing element is arranged between the holding element and the mounting element so that the holding element and the mounting element are arranged at a distance from one another,
    wherein at least one guide pin is arranged in the holding element and projects out of the side of the holding element facing the mounting element, and
    wherein the spacing element comprises a hollow body which is arranged around the at least one guide pin.

2. The coupling device of claim 1, wherein the at least one optical waveguide is held in the holding element such that the at least one optical waveguide projects out of the holding element on a side of the holding element facing the mounting element, so that a section of the at least one optical waveguide is arranged in an intermediate space between the holding element and the mounting element.

3. The coupling device of claim 1, wherein the holding element has at least one guide tube for holding the at least one optical waveguide.

4. The coupling device of claim 1, wherein the holding element contains glass, ceramic or plastic.

5. The coupling device of claim 1, wherein the holding element comprises a ferrule.

6. The coupling device of claim 1, wherein the spacing element comprises a tubular sleeve comprising a nickel-cobalt ferrous alloy.

7. The coupling device of claim 1, wherein the mounting element has at least one cavity for holding the at least one guide pin.

8. The coupling device of claim 1, wherein the mounting element has an accommodation element for holding the optical component.

9. The coupling device of claim 1, wherein the optical component is arranged on a side of the mounting element facing the holding element.

10. The coupling device of claim 1, wherein the optical component comprises at least one of an optical transmitter and an optical receiver.

11. The coupling device of claim 10, wherein at least one optical receiver is arranged around the optical transmitter on the mounting element.

12. The coupling device of claim 11, wherein a protective layer is arranged between the at least one optical waveguide and the optical component such that the optical component and one end of the section of the at least one optical waveguide are surrounded by the protective layer.

13. The coupling device of claim 1, wherein one end of the section of the at least one optical waveguide which projects out of the holding element is cut off at an angle other than 90° with respect to a longitudinal axis of the at least one optical waveguide.

14. A method for producing a coupling between at least one optical waveguide and an optical component, comprising:
    holding the at least one optical waveguide on a holding element;
    mounting the optical component to a mounting element;
    disposing a spacing element to the holding element or to the mounting element; and
    fitting the holding element to the mounting element to couple the at least one optical waveguide to the optical component; and
    disposing a tubular sleeve on a guide pin which projects out of the holding element or the mounting element.

15. The method of claim 14, further comprising:
    removing a coating from a section of the at least one optical waveguide; and
    inserting the at least one optical waveguide into at least one guide tube in the holding element such that a part of the section of the at least one optical waveguide projects on a side of the holding element facing the mounting element.

16. The method of claim 14, further comprising shortening the part of the section of the at least one optical waveguide which projects out of the holding element, wherein during the shortening, one end of said part of the section of the at least one optical waveguide which projects out of the holding element is cut off at an angle other than 90° with respect to a longitudinal axis of the at least one optical waveguide.

17. The method of claim 16, further comprising heating the end of said part of the section of the at least one optical waveguide which project's out of the holding element, such that the end has a rounded shape.

18. The method of claim 16, further comprising etching the end of the part of the section of the at least one optical waveguide which projects out of the holding element, so that the end has a rounded shape.

19. The method of claim 14, wherein before the optical component is fitted to the mounting element, an area at which the optical component is to be mounted to the mounting element is determined at a distance from the cavity of the mounting element.

20. The method of claim 14, further comprising disposing a protective layer between the optical component and the at least one optical waveguide.

21. The method of claim 14, further comprising disposing an optical transmitter or an optical receiver to the mounting element.

22. A method for producing a coupling between at least one optical waveguide and an optical component, comprising:
    holding the at least one optical waveguide on a holding element;
    mounting the optical component to a mounting element;
    disposing a spacing element to the holding element or to the mounting element;
    fitting the holding element to the mounting element to couple the at least one optical waveguide to the optical component;
    mounting an optical transmitter to the mounting element in order to inject light into said section of the at least one optical waveguide which projects out of the holding element;
    mounting at least one optical receiver to the mounting element in order to receive light which is reflected at one end of said part of the section of the at least one optical waveguide which projects out of the holding element; and
    providing of a control unit for controlling the light which is produced by the optical transmitter, as a function of an intensity of the light received by the at least one optical receiver.

* * * * *